United States Patent [19]

Kelly

[11] 4,364,054

[45] Dec. 14, 1982

[54] METHOD AND APPARATUS FOR FLUID JET PRINTING

[75] Inventor: Arnold J. Kelly, Princeton Junction, N.J.

[73] Assignee: Exxon Research and Engineering Co., Florham Park, N.J.

[21] Appl. No.: 239,217

[22] Filed: Mar. 2, 1981

[51] Int. Cl.[3] .............................................. G01D 15/16

[52] U.S. Cl. ........................................ 346/1.1; 346/75; 346/140 R

[58] Field of Search ................... 346/140 R, 158, 159, 346/161, 75, 1.1; 101/DIG. 13, 1

[56] References Cited

U.S. PATENT DOCUMENTS

| | | | |
|---|---|---|---|
| 3,553,719 | 1/1971 | Miyazaki | 346/140 |
| 3,582,954 | 6/1971 | Skala | 346/140 X |
| 3,693,179 | 9/1972 | Skala | 346/140 X |
| 3,750,564 | 8/1973 | Bettin | 346/140 X |

*Primary Examiner*—Joseph W. Hartary

*Attorney, Agent, or Firm*—Robert S. Salzman; Paul E. Purwin

[57] ABSTRACT

A method and apparatus for fluid jet printing features a triode structured charge injection system. The ink jet system is not dependent upon the conductivity of the ink fluid to form and target the ink fluid. Two electrodes are in contact with the ink liquid and they are submerged in the fluid. One electrode is an emitter and serves to field emit charge into the liquid in response to a voltage between it and the other electrode. Depending upon the electrical mobility of the ink fluid, the injected charge will be trapped in the liquid. The liquid is then forced from an orifice and can be made to undergo break-up into droplets similar to inductively charged inks. The paper or target upon which the droplets impinge functions as a third electrode, returning the charge and completing the circuit. The ink may also be propelled as a charged column, which column can be directed by an extraneous electrical field for targeting upon the printing paper.

44 Claims, 4 Drawing Figures

METHOD AND APPARATUS FOR FLUID JET PRINTING

FIELD OF THE INVENTION

This invention pertains to ink jet printing, and more particularly, to a new approach to ink jet printing which is fluid independent when electrically charging the fluid.

BACKGROUND OF THE INVENTION

Heretofore, certain ink jet systems have relied upon inductive charging of electrically conductive ink fluids in order to project charged ink droplets upon a printing target. Such systems are well known in the art, and all are fluid dependent, i.e. they require an ink fluid having a minimum electrical conductivity in order to adequately charge and project the ink fluid. These systems generally comprise a two electrode, diode type-structured inductive charging system. A typical prior art system of the aforementioned type is illustrated in U.S. Pat. No. 4,220,958 issued: Sept. 2, 1980.

In these diode type devices, the conductive ink flows through an orifice which is usually grounded. After exiting the orifice and while still a continuous columnar jet, the stream passes coaxially without physical contact through a second, usually cylindrical, electrode. This electrode is at a different potential from the orifice and the conductive ink liquid. As a result, an induced current flows through the ink to the protruding liquid column, and excess charge (of sign opposite to the cylindrical electrode) is in the fluid.

The exiting column breaks into droplets by electrohydro-dynamic, fluid-dynamic, mechanical or other means, thereby isolating the charge on the droplets. In order for the inductive charging process to work, it is essential that the fluid (ink) have sufficient electrical conductivity to permit adequate current to flow in the exiting jet and appropriate levels of charge to accumulate. Therefore, these systems are critically dependent upon the innate electrical conductivity of the ink for their operation.

The present invention features an entirely new approach to ink jet printing. The subject invention has its roots in research involving the atomization of fluids, and the developed theory supporting the electrostatic spraying of these fluids. Dr. Arnold J. Kelly, the present inventor, has pioneered this research at the Exxon Research and Engineering Laboratories in Linden, N.J., and is the proud holder of U.S. Pat. No. 4,255,777 issued: Mar. 10, 1881, entitled: "Electrostatic Atomizing Device". Dr. Kelly is also the author of the following articles: "Electrostatic Metallic Spray Theory", Journal of Applied Physics, Vol. 47, No. 12, December 1976; and "Electrostatic Spray Theory", Journal of Applied Physics, Vol. 49, No. 5, May 1978.

Inasmuch as this patent, and these articles may prove helpful in understanding the present invention, the teachings advanced therein are meant to be incorporated herein by way of reference.

By contrast, the charge injection process proposed by this invention can charge non-conductive and poorly conductive liquids as well as conductive liquids. In the inventive system, two electrodes are in contact with the liquid and are submerged by the liquid. One electrode is an emitter and serves to field emit charge into the liquid in response to a voltage difference imposed between it and the other (blunt) submerged electrode. Depending upon the electrical mobility of the fluid, the injected charge will be more or less trapped in the fluid and swept to the outside by the bulk motion of the fluid (ink). Once free of the dual electrode charging station, the exiting stream can be made to undergo breakup in a similar manner as that described for the aforementioned inductive system. The charge is thereby trapped on individual droplets. The paper or target upon which the droplets impinge functions as the third electrode, returning the charge and completing the circuit. The system as described, represents a triode-structured system, which to the best of our knowledge and belief is entirely new within the art.

Additional mechanical or vibrational pulsing of the ink fluid may be used to project ink droplets from an orifice in a traditional droplet formation scheme, with the charge injection functioning as a means to control droplet formation and direction.

The charge injection process is of particular interest because it is: (a) essentially independent of fluid conductivity; and (b) compact and capable of modest voltage operation.

It should be noted that the field emitter, dual submerged electrode geometry described, is but one of a very broad class of possible devices that can be used to charge inject liquids. For instance, a conventional thermionic vacuum electron gun, firing through an appropriate window can be used to charge the flowing ink stream prior to exiting the head. Therefore, the invention is not to be limited by any specific exposition, description of which is exemplary and meant only to convey an understanding of the invention.

BRIEF SUMMARY OF THE INVENTION

The invention relates to a method and apparatus for fluid jet printing. The method comprises the steps of:

(a) introducing a supply of ink fluid to a fluid jetting means comprising a capillary-sized orifice; and (b) injecting a controlled amount of electrical charge into the ink fluid below a charge level necessary to cause jet atomization of the ink fluid, but of sufficient amount to permit proper formation and targeting of the ink fluid.

More particularly, the method can also be described by the following steps of:

(a) continuously introducing a supply of ink fluid to a fluid jetting means comprising a capillary-sized orifice;

(b) continuously injecting an electrical charge into the ink fluid; and (c) controlling the amount of electrical charge being continuously injected into the fluid, the electrical charge being below a level necessary to cause atomization of the ink fluid, but of sufficient amount to permit proper formation and targeting of the ink fluid.

For purposes of definition, the phrase of "injecting an electrical charge into the ink fluid" shall mean: forceably injecting charge by means of an emitter electrode or electronic gun or other appropriate apparatus, into the ink fluid other than by way of induction, for creating excess free charge in the fluid.

The apparatus of the invention comprises:

a fluid jetting means having a capillary-sized orifice for receiving and jetting a supply of ink fluid;

a fluid reservoir for supplying ink fluid to the fluid jetting means; and means for injecting an electrical charge into the ink fluid.

The ink fluids for use with the invention will generally be electrically poorly or non-conductive, but not necessarily limited thereto. The ink fluid can be selected from a wide variety of printing fluid materials consisting of at least one of the following: oleic acid, castor oil, a hydrocarbon fluid, an aliphatic fluid, an alkyl fluid, an aromatic fluid, and a fluorocarbon fluid.

The ink fluid is injected with a charge generally below a level of 10 Coulombs/m$^3$. In one embodiment the fluid is continuously jetted from the orifice having a laminar flow rate.

The ink is projected at a grounded platen.

The diameter of the orifice, which can be coated with a non-wetting material such as Teflon®, is generally about 0.005 to 0.0005 inches and the ink fluid may be generally jetted at a flow rate of approximately 0.20 to 30 meters/sec. The charge injected into the ink fluid may have a voltage of approximately 1 KV. The ink fluid can be injected with an alternating, pulsed, time transient or wave-shaped charge if so desired.

It is an object of this invention to provide an improved method and apparatus for ink jet printing.

It is another object of the invention to provide a method and apparatus for ink jet printing which injects charge into the ink fluid rather than inductively charging the fluid.

It is still another object of this invention to provide a method and apparatus for ink jet printing which charges the ink fluid, but which is not dependent upon the electrical conductivity of the ink fluid for the operation thereof.

These and other objects of the invention will be better understood and will become more apparent with reference to the following detailed description considered in conjunction with the accompanying drawings.

DETAILED DESCRIPTION OF THE INVENTION

Figure 1:
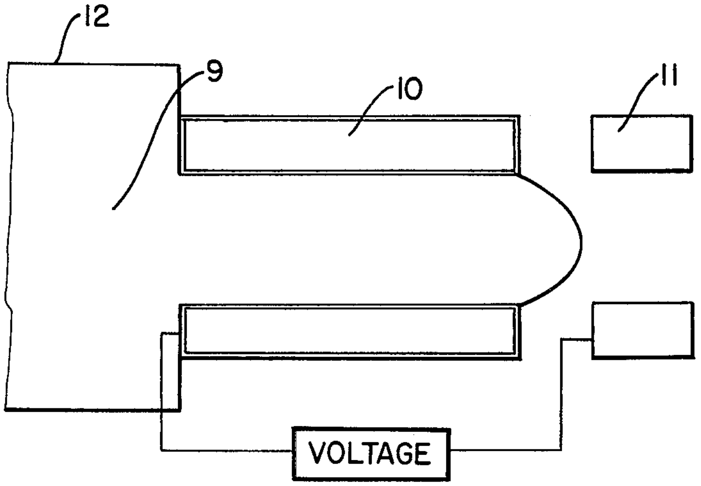
PRIOR ART FIG. 1
FIG. 1 is a schematic view of a charge induced ink fluid device for ink jet printing, as generally described by the prior art.

Generally speaking, the invention features a new triode-structured device for charge injecting an ink fluid for the purposes of ink jet printing. In order that a clear distinction can be drawn between the prior art devices which utilize charge induction, reference will be made to a charge induced ink fluid device shown in FIG. 1. The prior art device of FIG. 1 is a diode-structured system consisting of two annular electrodes 10 and 11, respectively. Ink 9 from a reservoir 12 is supplied to the electrode 10, which may also serve as a capillary tube for holding and emitting the ink fluid 9, as shown. The electrode charges the electrically conductive ink 9 with a negative charge so that the ink is attracted to the positively charged electrode 11. In this way, the ink fluid 9 is projected towards a printing target (not shown).

Figure 2:
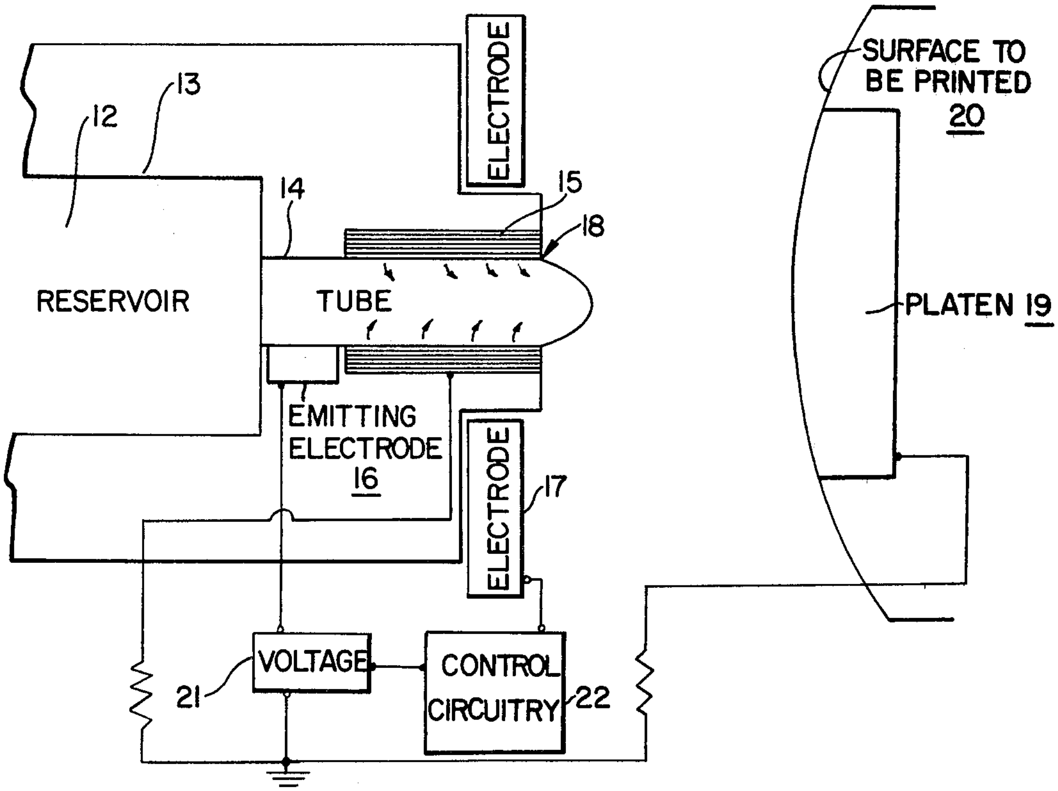
FIG. 2 is a schematic view of a charge injected ink fluid device for ink jet printing in accordance with the teachings of this invention.

By contrast, the invention features a triode-structured device, generally illustrated by the schematic view of FIG. 2.

Ink 12 is held in reservoir 13 by capillary forces. The capillary restraining force is produced by the small diameter (<100 μm) orifice 18 of tube 14, the walls of which are coated with non-wetting material 15, e.g. Teflon®.

Upon command, an emitting electrode or electron gun 16 is energized. Under action of the field between this electrode 16 and the submersed electrode 15, sufficient electric field is produced to cause injection of charge into the ink 12 in tube 14. Just sufficient charge is injected to overcome the restraining surface tension forces and to provide a positive body force ejecting the ink from tube 24 and establishing a continuous flow. It should be noted that charge injection can perform a three-fold purpose: (1) it acts as a fast-acting valve to start the ink flow and ultimately to stop it; (2) it assists in ejecting ink from the tube; and (3) it charges the ink to permit further manipulation by an exogenous electric field.

It is important to realize that the fluid can be flowed continuously in this scheme which is not constrained to pulsed operation as is the case where droplets are formed.

Ink charge levels are restricted below the level that would lead to jet atomization, i.e. 10 Coulombs/m$^3$. The device may be operated in a laminar flow regime. A grounded platen 19 behind the surface to be printed 20 assists in developing an electric field attracting the ink jet to the surface 20.

By radially segmenting control electrode 17 and applying voltage preferentially to one or more of the segments, it will be possible to laterally deflect the charged ink stream. The amount of deflection will be a function of orifice/paper spacing and the overall spacing of the contiguous injector units necessary for character formation. By optimizing the configuration of these units, it should be possible to provide sufficient deflection capability to produce characters having quality rivalling that from impact printing.

The generally small dimensions of this print head implies use of injection voltages of about 1 KV.

By way of contrast with the charge induction system of FIG. 1, the inventive system can charge poorly conductive liquids. The emitter electrode 16 serves to field emit charge into the liquid 12 in response to a voltage difference imposed between it and another (blunt) submerged electrode (15). Depending upon the electrical mobility of the fluid, the injected charge will be more or less trapped in the fluid and swept to the outside by the bulk motion of the ink fluid 12. Once free of the orifice 18, the exiting stream can be made to undergo breakup in the manner described for the inductive system and thereby trap the charge on individual droplets. The platen or target 20 to which the droplets are projected functions as the third electrode, returning the charge and completing the circuit. The system as described represents a triode-structured system. Appropriate voltage generating circuitry 21 and control circuitry 22 are within the state of the art.

Specific droplet sizes can be produced by the proper application of voltage wave forms to the inductive electrode 10 of the device of FIG. 1. Such a configuration is capable of inducing a varying electrohydrodynamic force on the coaxially flowing column and hence to produce a prescribed disruption in the column so as to produce droplets of a desired size. The same effect can also be obtained by appropriate periodic charge injection into the flowing ink of this invention. As the ink fluid emerges from orifice 18, the excess charge in the fluid 12 now distributed in a spatially periodic fashion, will produce jet instability and the development of droplets of a preselected size.

The charge injection process is of particular interest because it is: (a) essentially independent of fluid conductivity; (b) compact and capable of low voltage operation.

It should be noted that the field emitter electron gun (dual submerged electrode 15, 16 geometry) is but one of a very broad class of possible devices that can be used to charge inject liquids. For instance, a conventional thermionic vacuum electron gun, firing through an appropriate window can be used to charge the flowing ink stream prior to exiting the orifice 18.

OPERATION OF THE CHARGE INJECTION PRINTING APPARATUS OF THIS INVENTION

Formation of an ink fluid jet will be discussed with reference to FIGS. 3 and 4. Droplet development as a result of charge injection need not occur immediately after the stream exits the orifice 18. At sufficiently low enough charging levels, the jetted stream is unperturbed for useful lengths by the presence of free charge within it. And, even during vigorous jetting, the charged stream may retain its general identity for several centimeters at which point it undergoes disruption to form droplets.

The ink jet Triode system shown in FIG. 2 is typically operated below the maximum voltage, charge injection level, and charge density value, all of which are defined by the limiting electrical breakdown strength of the ink fluid column exiting the orifice 18.

In the absence of subsidiary droplet formation mechanisms, the electrically unenergized flow from the ink jet Triode is usually in the form of a smooth uniform column. For discussion purposes, the orifice and the ink fluid column are assumed to have a circular cross section. The flow exiting from orifices that have other geometries will exhibit more involved fluid mechanical behavior (when unenergized) as compared to flows from circular orifices. This added variation complicates the detailed description of the jet behavior during charge injection but does not alter the general behavior pattern. All jets undergo the same overall modification in response to variation in injected charge density levels.

An initially unenergized ink stream or ink column will remain columnar for a protracted distance until disruption into a colinear droplet train occurs by random aerodynamic and mechanical vibratory forces. The stream will usually break into droplets at about 20 cm from the orifice exit plane in a vertical mode (orifice directed downward) for the case to be discussed.

As the applied voltage ($-$Va) is increased, charge injection of the fluid occurs and the stream current ($-I_c$) starts to increase monotonically and nonlinearly. For the test conditions noted in the following table I, the first evidence of electristatically induced modification of the exiting stream occurs at Va$=-5467$ V, Ic$=-0.25$ ma, $\bar{\rho}e=-0.61$ C/m$^3$.

TABLE I

| INK JET COLUMN DISRIPTION TEST CONDITIONS | |
|---|---|
| Flow Rate | 0.42 ± 0.01 mL/sec |
| Input Pressure | 140 ± 1 kPa |
| Orifice Diameter | 225 ± 5μm |
| Maximum Operating Voltage | −8185 V |

TABLE I-continued

| INK JET COLUMN DISRIPTION TEST CONDITIONS | |
|---|---|
| Maximum Injected Current | −0.68μa |
| Maximum Mean Charge Density Level | 1.49 C/m$^3$ |
| Bulk Flow Velocity | 10.81 m/sec. |
| Marcol-87, 24° C. | |
| Exxon White Oil - S 2912 | |
| Density 0.845 (Gm/Cm$^3$) | |
| Viscosity 35 (cp) | |
| Innate Electrical Conductivity ½ × 10$^{-12}$ (MHO/m) | |
| Surface Tension 0.033 (N/m) | |

There is a coordinated breakup of the stream into droplets that are smaller than those produced by random vibration. In addition, these droplets can be seen to be exponentially diverging from the stream. The point at which the droplets first diverge from the columnar stream due to their mutual repulsion is difficult to measure with precision. The transition is very smooth and, particularly at the charge density levels close to the maximum operating condition, accompanied by the presence of a sheath of small (20 μm) droplets which can partially obscure the inner core droplet formation process.

Figure 4:
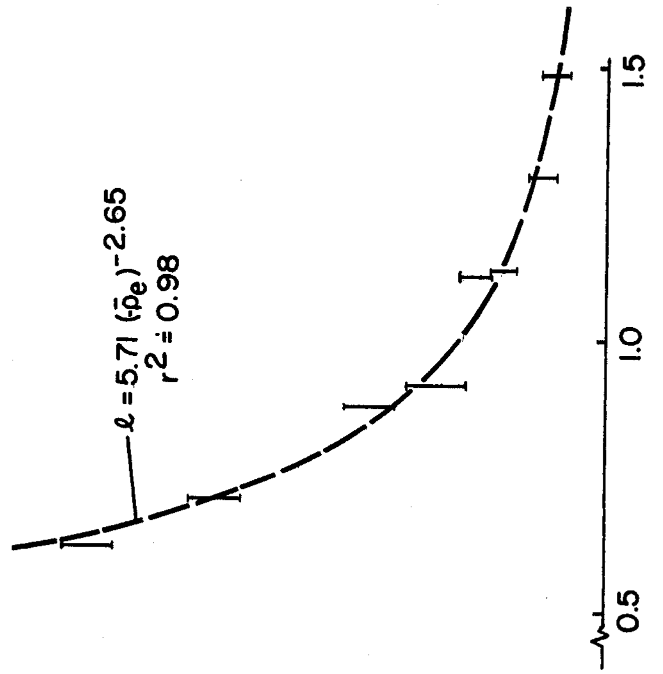
FIGS. 3 and 4 are graphical representations of ink jet formation parameters for the ink fluid device shown in FIG. 2.
Figure 3:
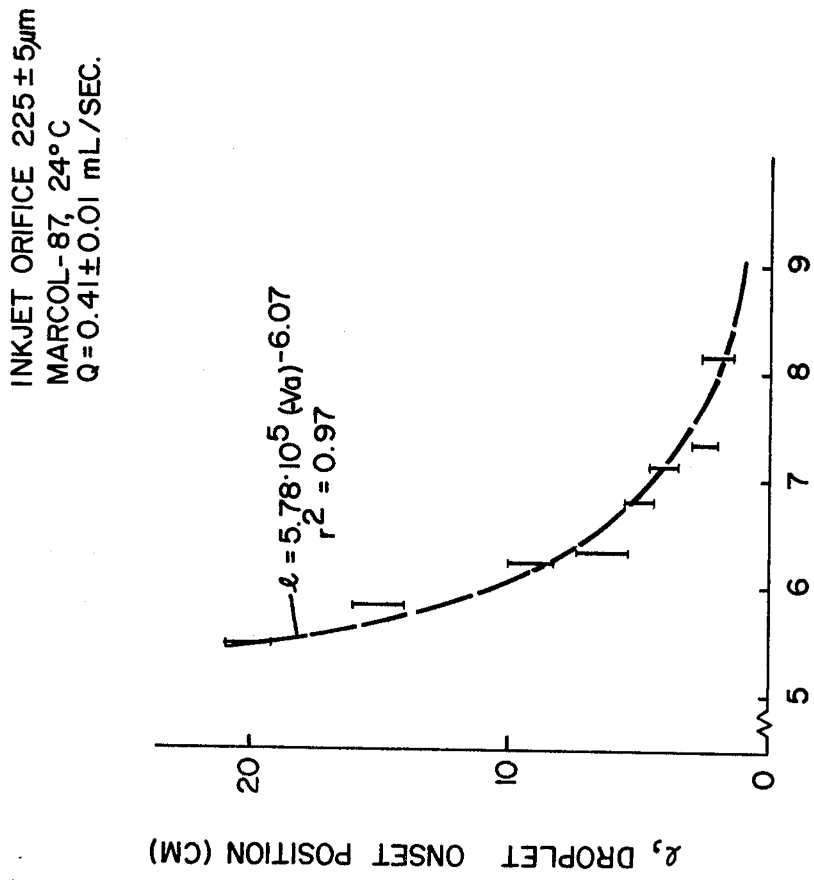

Despite the uncertainty associated with the defining the point at which disruption strats, which is the major source of experimental error, the trends, as revealed in FIGS. 3 and 4, are unambiguous. A charge density level between ⅓ and ½ of the maximum is required to start the description within the range of distances available in the test (30 cm). Below this charge density level the charged stream is actually little influenced by the presence of charge. The disruption position approaches the orifice exit plane with increasing charge density level, until, for the specific conditions of this case, it comes no closer than 2±1 cm. At this condition an intense haze of small droplets is to be seen emanating directly from the orifice. Smaller orifices, higher charge density levels, or lower flow rates all act to shorten, and in the limit reduce to zero, the orifice-disruption point distance.

The ink jet system of FIG. 2 can be operated in a columnar mode, wherein an ink fluid column is directed onto a paper target by an external electric field, or in a droplet mode, wherein the injected charge levels and system dimensions are chosen to produce a droplet stream. Additional mechanical or vibrational pulsing of the ink fluid may be used to project ink droplets from the orifice in a traditional droplet formation scheme, wherein the charge injection functions to charge the ink fluid for purposes of controlling formation and direction of the droplets.

Having described the subject invention, what is desired to be protected by Letters Patent is presented by the following appended claims.

What is claimed is:

1. A method of fluid jet printing, comprising the steps of:

(a) introducing a supply of ink fluid to a fluid jetting means comprising at least one capillary-sized orifice; and (b) forceably injecting a controlled amount of electrical charge inside said ink fluid wherein said charge will be substantially trapped by said ink fluid, said charge being below a charge level necessary to cause jet atomization of said ink fluid, but of sufficient amount to permit proper formation and targeting of said ink fluid.

2. The method of claim 1, wherein said ink fluid is electrically non-conductive.

3. The method of claim 1, wherein said ink fluid is injected with charge below a level of approximately 10 Coulombs/$m^3$.

4. The method of claim 1, wherein said ink fluid can be jetted from said orifice with a laminer flow rate.

5. The method of claim 1, wherein said fluid jet printing is a continuous fluid flow process.

6. The method of claim 1, wherein said ink fluid is projected at a grounded platen.

7. The method of claim 1, wherein said orifice has a diameter in a range of approximately 0.005 to 0.0005 inches.

8. The method of claim 1, wherein said ink fluid is injected with charge at a voltage of approximately 1 KV.

9. The method of claim 1, wherein said ink fluid is selected from but not limited to a group of printing fluid materials consisting of at least one of the following: oleic acid, castor oil, a hydrocarbon fluid, an aliphatic fluid, an alkyl fluid, an aromatic fluid, and a fluorocarbon oil.

10. The method of claim 1, wherein said ink fluid is injected with a wave-shaped charge.

11. The method of claim 1, wherein said ink fluid is injected with an alternating charge.

12. The method of claim 1, wherein said ink fluid is injected with a time transient charge.

13. The method of claim 1, wherein said ink fluid is injected with a pulsed charge.

14. A method of fluid jet printing, comprising the steps of:

(a) continuously introducing a supply of ink fluid to a fluid jetting means comprising at least one capillary-sized orifice;

(b) continuously injecting an electrical charge inside said ink fluid wherein said charge will be substantially trapped by said ink fluid; and (c) controlling the amount of electrical charge being continuously injected into said fluid, said electrical charge being below a level necessary to cause atomization of said ink fluid, but of sufficient amount to permit proper targeting of said ink fluid.

15. The method of claim 14, wherein said ink fluid is electrically non-conductive.

16. The method of claim 14, wherein said ink fluid is injected with charge below a level of approximately 10 Coulombs/$m^3$.

17. The method of claim 14, wherein said ink fluid can be jetted from said orifice with a laminar flow rate.

18. The method of claim 14, wherein said ink fluid is projected at a grounded platen.

19. The method of claim 14, wherein said orifice has a diameter in a range of approximately 0.005 to 0.0005 inches.

20. The method of claim 14, wherein said ink fluid is injected with charge at a voltage of approximately 1 KV.

21. The method of claim 14, wherein said ink fluid is selected from a group of printing fluid materials consisting of at least one of the following: oleic acid, castor oil, a hydrocarbon fluid, an aliphatic fluid, an alkyl fluid, an aromatic fluid, and a fluorocarbon oil.

22. The method of claim 14, wherein said ink fluid is injected with a wave-shaped charge.

23. The method of claim 14, wherein said ink fluid is injected with an alternating charge.

24. The method of claim 14, wherein said ink fluid is injected with a time transient charge.

25. The method of claim 14, wherein said ink fluid is injected with a pulsed charge.

26. An apparatus for jet printing an ink fluid, comprising:

a fluid jetting means having at least one capillary-sized orifice for receiving and jetting a supply of ink fluid;

a fluid reservoir for supplying ink fluid to said fluid jetting means; and means for injecting an electrical charge inside said ink fluid wherein said charge is substantially trapped by said ink fluid.

27. The apparatus of claim 26, wherein said orifice comprises a non-wetting surface for said ink fluid.

28. The apparatus of claim 26, wherein said ink fluid is electrically non-conducting.

29. The apparatus of claim 26, further comprising a ground platen disposed ahead of said orifice for supporting printing paper to receive said jetted ink fluid.

30. The apparatus of claim 26, wherein said orifice is coated with a non-wetting material.

31. The apparatus of claim 26, wherein said orifice has a diameter in range approximately from 0.005 to 0.0005 inches.

32. The apparatus of claim 26, wherein said means for injecting charge into said ink fluid comprises an emitting electrode in contact with said ink fluid and a second electrode in contact with said ink fluid in proximity to said emitting electrode, said electrodes forming a submerged electron gun for injecting charge into said ink fluid.

33. The apparatus of claim 26, wherein said means for injecting charge into said ink fluid comprises an electron gun.

34. The apparatus of claim 26, wherein said fluid jetting means is operated continuously.

35. The apparatus of claim 26, wherein said fluid jetting means can jet said ink fluid with a substantially laminar flow.

36. The apparatus of claim 26, wherein said fluid jetting means can jet said ink fluid with a substantially turbulent flow.

37. The apparatus of claim 26, further comprising means for establishing an electric field about said orifice comprises a substantially annular electrode disposed around said orifice for targeting and inducing break-up of said ink fluid.

38. The apparatus of claim 26, wherein said means for injecting charge into said ink fluid is operated at approximately 1 KV.

39. The apparatus of claim 26, wherein said means for injecting charge into said ink fluid injects charge in an approximate amount below that required to atomize said ink fluid.

40. The apparatus of claim 26, wherein said means for injecting charge into said ink fluid injects charge in an approximate amount below 10 Coulombs/$m^3$.

41. The apparatus of claim 26, wherein said means for injecting charge into said ink fluid injects a wave-shaped charge.

42. The apparatus of claim 26, wherein said means for injecting charge into said ink fluid injects an alternating charge.

43. The apparatus of claim 26, wherein said means for injecting charge into said ink fluid injects a time transient charge.

44. The apparatus of claim 26, wherein said means for injecting charge into said ink fluid injects a pulsed charge.

* * * * *